(12) United States Patent
Blanchet et al.

(10) Patent No.: US 7,321,598 B2
(45) Date of Patent: Jan. 22, 2008

(54) METHOD AND APPARATUS FOR CONNECTING IPV6 DEVICES THROUGH AN IPV4 NETWORK USING A TUNNELING PROTOCOL

(75) Inventors: Marc Blanchet, St-Augustin (CA); Florent Parent, Cap-Rouge (CA)

(73) Assignee: Hexago Inc., Montreal, Quebec (CA)

( * ) Notice: Subject to any disclaimer, the term of this patent is extended or adjusted under 35 U.S.C. 154(b) by 986 days.

(21) Appl. No.: 10/195,396

(22) Filed: Jul. 16, 2002

(65) Prior Publication Data

US 2004/0013130 A1 Jan. 22, 2004

(51) Int. Cl.
*H04J 3/16* (2006.01)
*H04J 3/22* (2006.01)

(52) U.S. Cl. .................... 370/466; 370/389

(58) Field of Classification Search ........... 370/466, 370/389
See application file for complete search history.

(56) References Cited

U.S. PATENT DOCUMENTS

| | | | |
|---|---|---|---|
| 6,038,233 A | 3/2000 | Hamamoto et al. | 370/401 |
| 6,118,784 A | 9/2000 | Tsuchiya et al. | 370/401 |
| 6,625,156 B2 * | 9/2003 | Shaio et al. | 370/395.21 |
| 6,671,729 B1 * | 12/2003 | Gordon et al. | 709/227 |
| 2002/0016926 A1 * | 2/2002 | Nguyen et al. | 713/201 |
| 2002/0065906 A1 * | 5/2002 | Davidson et al. | 709/222 |
| 2002/0065921 A1 * | 5/2002 | Davidson et al. | 709/227 |
| 2003/0005328 A1 | 1/2003 | Grewal et al. | 713/201 |
| 2003/0088702 A1 | 5/2003 | Iwata et al. | 709/245 |
| 2003/0225911 A1 | 12/2003 | Lee et al. | 709/245 |

FOREIGN PATENT DOCUMENTS

| | | |
|---|---|---|
| WO | WO 01/22664 A1 | 3/2001 |
| WO | WO 03/041365 | 5/2003 |
| WO | WO 03/084184 A1 | 10/2003 |
| WO | WO 03/084185 | 10/2003 |

OTHER PUBLICATIONS

IETF Notice re publication of draft-vg-ngtrans-tsp-00.txt, Jul. 19, 2001.
IETF Notice re publication of draft-vg=ngtrans-tsp-v6v4profile-00.txt, Jul. 19, 2001.
Web Site Article: "Tunnel Setup Protocol", Viagénie Inc., 2001.
Internet Draft—RFC 1933 "Transition Mechanisms for IPv6 Hosts and Routers", Gilligan et al., Apr. 1996.
Internet Draft—RFC 2529 "Transmission of IPv6 Over IPv4 Domains without Explicit Tunnels", Carpenter, et al, Mar. 1999.

(Continued)

*Primary Examiner*—Jay K. Patel
*Assistant Examiner*—Blanche Wong
(74) *Attorney, Agent, or Firm*—Kent Daniels; Ogilvy Renault LLP

(57) ABSTRACT

A tunnel setup protocol enables tunnel clients to set up IPv6-in-IPv4 networks to permit IPv6 nodes to communicate across the IPv4 network using IPv6 native packets. The tunnel setup protocol uses a control channel to negotiate tunnel configuration parameters and exchange tunnel configuration data between a tunnel client and a tunnel broker server. The tunnel setup is automatic, and migration to IPv6 is ameliorated.

30 Claims, 11 Drawing Sheets

OTHER PUBLICATIONS

Internet Draft—RFC 3053 "IPv6 Tunnel Broker", Durand et al, Jan. 2001.
Internet Draft—"IPv6 Tunnel Broker", Durand et al, Sep. 20, 2000.
Internet Draft—"Tunnel Setup Protocol (TSP)", Blanchet et al., Jun. 2001.
Internet Draft—IPv6 over IPv4 Profile for Tunnel Setup Protocol (TSP), Blanchet et al. Jul. 13, 2001.
Internet Draft—"An Overview of the Introduction of IPv6 in the Internet", Biemolt et al., Feb. 2002.
Internet Draft—"Intra-Site Automatic Tunnel Addressing Protocol (ISATAP)", Templin et al, Apr. 18, 2002.
Presentation—"IPv6 Transitiion Mechanisms", Viagénie (Blanchet et al.), May 2000.
Presentation—"Tunnel Setup Protocol", Viagénie (Blanchet et al.), Aug. 10, 2001.
Presentation—"Tunnel Setup Protocol", Viagénie (Blanchet), Nov. 1999.

* cited by examiner

METHOD AND APPARATUS FOR CONNECTING IPV6 DEVICES THROUGH AN IPV4 NETWORK USING A TUNNELING PROTOCOL

CROSS-REFERENCE TO RELATED APPLICATIONS

This is the first application filed for the present invention.

MICROFICHE APPENDIX

Not Applicable.

TECHNICAL FIELD

The invention relates in general to the transition of Internet Protocol (IP) networks from IP version 4 (IPv4) to IP version 6 (IPv6) and, in particular, to a method and apparatus for connecting IPv6 devices through an IPv4 network using a tunnel setup protocol.

BACKGROUND OF THE INVENTION

Internet Protocol (IP) was created in the 1960's by the United States Advanced Research Projects Agency (ARPA). The Agency's mission was to create instruments useful for military purposes, in particular communications and decentralized computer networks. The original idea was to create connections between military bases using a decentralized communications network with a mesh structure that would permit network function despite significant damage to the country's infrastructure sustained in a military attack. In the early years of its development, the Internet was used for data transfers, principally as file transfer protocol (FTP) sessions.

Use of the Internet spread from the military to the scientific and educational communities in the 1970's and 80's. Propagation of the Internet was, however, slow until the Worldwide Web (WWW) was created. The Worldwide Web was first intended to provide a convenient channel for the transfer of scientific information. However, it caught the attention of the commercial world and in the 1990's an explosive growth of the expansion of the Internet ensued. That explosive growth continues today. The current Internet uses an Internet Protocol referred to as IP version 4 (IPv4). IPv4 uses address fields that are 32 bits long. Although the potential number of IP addresses is $2^{32}$, over 70% of those addresses have already been assigned and, if as expected the explosive growth of the Internet continues at its current pace, total exhaustion of IPv4 addresses will occur by 2006. Consequently, the Internet Engineering Task Force (IETF) has developed a new Internet standard referred to as IPv6 which uses 128-bit addressing. The address space in IPv6 is intended to accommodate connection of substantially any intelligent electronic device to the IP network. This includes mobile devices.

It is well known that IPv4 and IPv6 are not compatible because of the differences in address space. Consequently, IPv4 and IPv6 networks can only be interconnected by gateway nodes provisioned with both IPv4 and IPv6 network stacks. However, because of the current lack of available IPv4 address space, IPv6 networks are being deployed and connected to the IPv4 network. A need has therefore arisen for equipment and methods to permit IPv6 devices to communicate across the IPv4 network in order to enhance IPv6 device interconnectivity. It is also well known that a data encapsulation technique known as tunneling can be used for transferring IPv6 packets across the IPv4 network. When an IPv6-in-IPv4 tunnel is created, IPv6 packets are encapsulated with IPv4 headers that are used to transfer the packets through the IPv4 network to a predetermined IPv4-IPv6 host or gateway. The establishment of IPv6-in-IPv4 tunnels is a complex process. Traditionally, the tunnels have been constructed using a manual process for setting up tunnel endpoints at edges of the IPv4 network. This is a time-consuming task that requires a considerable level of expertise and experience. Consequently, manual establishment of tunnels is unworkable with mobile devices and beyond the expertise of a majority of users.

Many known IPv6 transition techniques use tunneling to overlay an IPv6 network over an IPv4 network. Some of these techniques are manual, some are automated. RFC1933 entitled "Transition Mechanisms for IPv6 Hosts and Routers" (April 1996), describes how to encapsulate IPv6 packets in IPv4 packets. It also describes how to manually configure an IPv6-in-IPv4 tunnel. However, this is a completely manual process and is therefore not scalable.

An automated technique referred to as "6to4", is described in RFC3056 entitled "Connection of IPv6 Domains via IPv4 Clouds" (February 2001), which specifies an optional interim mechanism for IPv6 sites to communicate with each other over the IPv4 network without explicit tunnel setup, and for them to communicate with native IPv6 domains via relay routers. Effectively it treats the wide area IPv4 network as a unicast point-to-point link layer. The mechanism is intended as a start-up transition tool used during the period of co-existence of IPv4 and IPv6. It is not intended as a permanent solution. The document defines a method for assigning an interim unique IPv6 address prefix to any site that currently has at least one globally unique IPv4 address, and specifies an encapsulation mechanism for transmitting IPv6 packets using such a prefix over the global IPv4 network. The motivation for this method is to allow isolated IPv6 domains or hosts, attached to an IPv4 network which has no native IPv6 support, to communicate with other such IPv6 domains or hosts with minimal manual configuration, before they can obtain native IPv6 connectivity. It incidentally provides an interim globally unique IPv6 address prefix to any site with at least one globally unique IPv4 address, even if combined with an IPv4 Network Address Translator (NAT).

Another automated technique referred to as "6over4" is described in RFC2529, which is entitled "Transmission of IPv6 over IPv4 Domains without Explicit Tunnels" (March 1999). In accordance with this technique, the IPv4 address of the destination endpoint is embedded in the prefix part of the IPv6 destination address. This allows isolated IPv6 hosts, located on a physical link which has no directly connected IPv6 router, to become fully functional IPv6 hosts by using an IPv4 multicast domain as their virtual local link. Thus, at least one IPv6 router using the same method must be connected to the same IPv4 domain if IPv6 routing to other links is required. This is therefore a host-to-network or a network-to-network mechanism.

Internet draft IETF-ngtrans-isatap dated Apr. 18, 2002 and entitled "Intra-Site Automatic Tunnel Addressing Protocol (ISATAP)" specifies a protocol that connects IPv6 hosts and routers (nodes) within IPv4 sites. ISATAP is a transition mechanism that enables incremental deployment of IPv6 by treating the site's IPv4 infrastructure as a Non-Broadcast Multiple Access (NBMA) link layer for IPv6. ISATAP mechanisms use an IPv6 interface identifier format that embeds an IPv4 address—this enables automatic IPv6-in-IPv4 tunneling within a site, whether the site uses globally assigned or private IPv4 addresses. The interface identifier format can be used with both local and global unicast IPv6 prefixes—this enables IPv6 routing both locally and globally. ISATAP mechanisms introduce no impact on routing table size and require no special IPv4 services (e.g., IPv4 multicast).

A semi-automatic establishment of IPv6-in-IPv4 tunnels is described in RFC3053 entitled "IPv6 Tunnel Broker" (January 2001). The tunnel broker described in this document is a worldwide web implementation that permits end-users to select a pre-configured IPV6-in-IPv4 tunnel. However, the system does not support any real negotiation between the end-user and the tunnel broker. If end-users use dynamic IPv4 addresses, a manual operation must be done to update the tunnel broker. This limits the scalability of deploying IPv6 networks, and introduces a considerable onus on inexperienced users.

Consequently, there exists a need for a method and apparatus for automating and simplifying the establishment of IPv6-in-IPv4 tunnels to facilitate adoption and use of IPv6, as well as to ameliorate the transition from IPv4 to IPv6.

SUMMARY OF THE INVENTION

It is therefore an object of the invention to provide a tunnel setup protocol for automating the establishment of IPv6-in-IPv4 tunnels through the IPv4 network.

It is a further object of the invention to provide a tunnel setup protocol that is suitable for use with mobile devices, to facilitate a transition from IPv4 to IPv6.

The invention provides a tunnel setup protocol that facilitates a transition from IPv4 to IPv6 by permitting IPv6 devices to communicate across the IPv4 network. In accordance with the invention, a control channel is established between a tunnel client and a tunnel broker server. The control channel established between the tunnel client and the tunnel broker server is used to exchange tunnel configuration information and, optionally, to negotiate configuration parameters for the IPv6-in-IPv4 tunnel. After the tunnel configuration parameters have been established, the tunnel broker server configures a tunnel broker server endpoint. The tunnel broker server endpoint may be supported by the tunnel broker server, or by another gateway node, such as an IPv4/IPv6 router connected to both the IPv4 and the IPv6 networks.

The tunnel client also configures a tunnel endpoint, referred to as the tunnel client endpoint for the IPv6-in-IPv4 tunnel. The tunnel client endpoint may likewise be configured on the tunnel client, or another IPv4/IPv6 node, such as a gateway router. In order to improve capacity, either the tunnel client or the tunnel broker server may have a list of nodes that support tunnel endpoints so that traffic loads can be distributed to improve throughput. The invention therefore permits the automated establishment of IPv6-in-IPv4 tunnels using a control channel. The use of the control channel enables the automated negotiation of specific configuration details, such as IPv6 prefix length, DNS delegation and router peering protocol. This facilitates the deployment of IPv6 networks and ameliorates the transition from IPv4 to IPv6. The invention is particularly useful in mobile devices since new IPv6-in-IPv4 tunnels can be rapidly and automatically configured to permit true, unencumbered mobility of those devices, thus enhancing the attraction of deploying IPv6.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a method and apparatus for connecting IPv6 devices through an IPv4 network using a tunnel setup protocol (TSP), as described in Applicant's Internet-Drafts, a first of which bears a date of June 2001 and was published on Jul. 18, 2001 and is entitled "Tunnel Setup Protocol (TSP) draft-vg-ngtrans-tsp-00", and the second of which bears a date of Jul. 13, 2001 and was published on Jul. 18, 2001, entitled "IPv6 over IPv4 profile for Tunnel Setup Protocol (TSP) draft-vg-ngtrans-tsp-v6v4profile-00", each of which is respectively incorporated herein by reference.

In accordance with the invention, a control channel is established between a tunnel client and a tunnel broker server. Both the tunnel client and the tunnel broker server must be connected to the IPv4 network. The control channel established between the tunnel client and the tunnel broker server is used to negotiate configuration parameters for an IPv6-in-IPv4 tunnel. After the configuration parameters are established, the tunnel broker server configures a tunnel broker server endpoint and the tunnel client configures a tunnel client endpoint for the IPv6-in-IPv4 tunnel. The respective tunnel endpoints may be configured on the respective tunnel client and tunnel broker server. Alternatively, either of the tunnel client and the tunnel broker server may configure remote tunnel endpoints. In order to improve capacity, either the tunnel client or the tunnel broker server may have a list of nodes that support tunnel endpoints so that traffic loads can be distributed to improve throughput. The invention therefore permits the automated establishment of IPv6-in-IPv4 tunnels, which facilitates the deployment of IPv6 networks and ameliorates the transition from IPv4 to IPv6.

Figure 1:
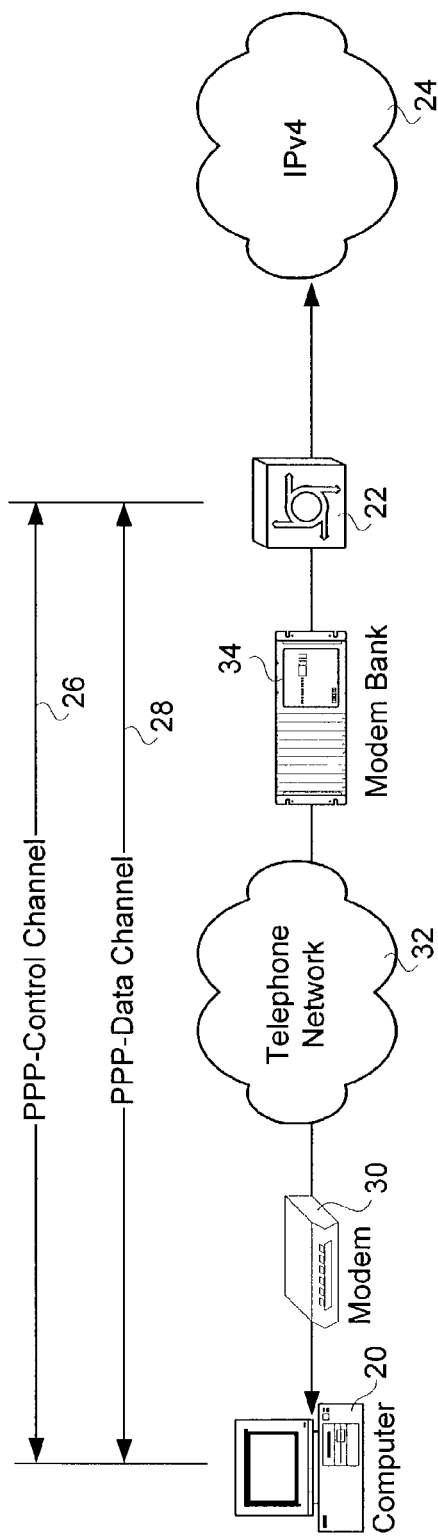
FIG. 1 is a schematic diagram of a point-to-point (PPP) data connection over a dial-up link between a computer and a network access server.

FIG. 1 is a schematic diagram of a point-to-point (PPP) dial-up connection between a client computer 20 and a network access server 22 to provide access to an IPv4 network 24 in a manner well known in the art. As is well understood, a PPP-control channel 26 is established over the dial-up connection between the client computer 20 and the network access server 22. The dial-up connection passes through a modem 30, a switched telephone network 32 and a modem bank 34 in a manner well known in the art. The PPP control channel 26 shares the dial-up connection with a PPP data channel 28, which is used to send IPv4 data packets from the client computer 20 to one or more selected hosts in the IPv4 network 24.

Figure 2:
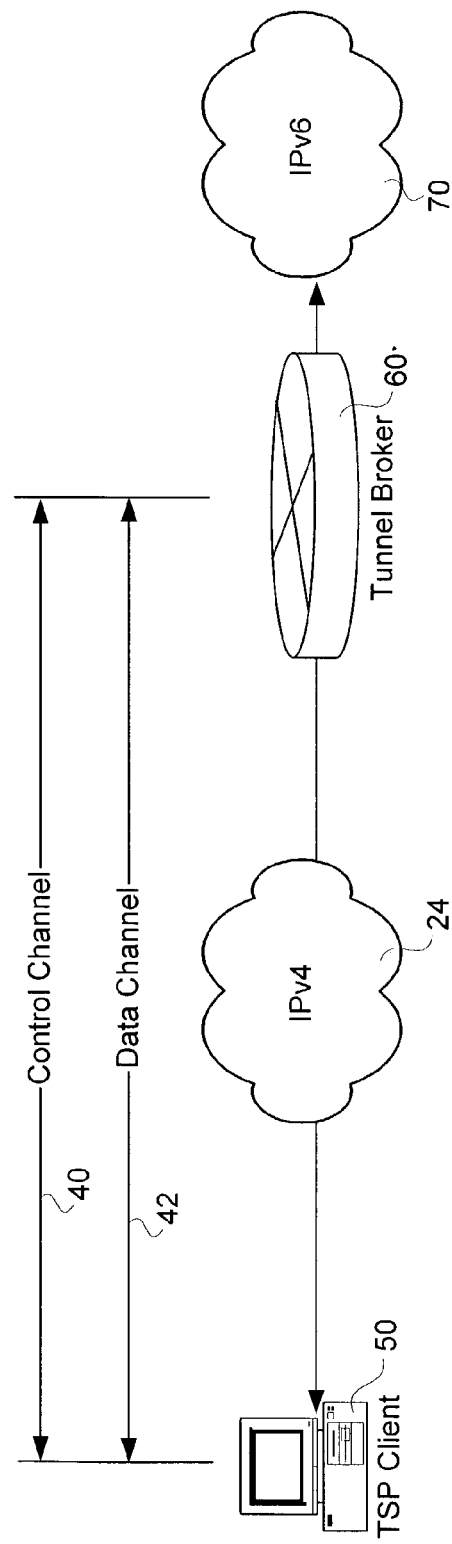
FIG. 2 is a schematic diagram of a connection between an IPv4/IPv6 node and an IPv6 network implemented in accordance with the invention.

FIG. 2 is a schematic diagram illustrating one implementation of a system provisioned with a tunnel setup protocol in accordance with the invention. In accordance with the invention, a control channel 40 is established through the IPv4 network 24 between a tunnel client 50 and a tunnel broker server 60 using a transfer control protocol (TCP) messaging. The control channel 40 is used to negotiate parameters for establishing an IPv6-in-IPv4 tunnel through the IPv4 network 24. The tunnel is used to establish a data channel 42 which extends between first and second tunnel endpoints. In this example, the tunnel endpoints are the tunnel client 50 and the tunnel broker server 60. The data channel is used to transfer IPv6 data packets through the IPv4 network. The IPv6 data packets are encapsulated at the opposite endpoints of the IPv6-in-IPv4 tunnel, as will be explained below in more detail.

FIGS. 3a-3d are a flow diagram illustrating the tunnel setup protocol in accordance with the invention. The process begins in step 100 when a tunnel setup protocol (TSP) client, hereinafter referred to as a tunnel client 50 (FIG. 2) connects to a tunnel broker server (TB) 60 using TCP, as explained above. Alternatively, the tunnel client 50 may use User Datagram Protocol (UDP) messaging to establish the control channel 40. After the control channel 40 is established, the tunnel client sends the version of the TSP that it supports using the control channel 40 to the tunnel broker server 60 (step 102). On receipt of the TSP protocol version, the tunnel broker server 60 determines whether it supports the same version of the tunnel setup protocol (step 104). If it is not provisioned to support the tunnel client's version of the tunnel setup protocol, the tunnel broker server 60 returns an error message via the control channel 40 (step 106) and branches to connector C (see FIG. 3d) where the tunnel broker server 60 determines whether it has an alternate list of tunnel broker servers that it can provide to the tunnel client (as will be explained below in more detail). If the tunnel broker server 60 does support the tunnel client's version of the tunnel setup protocol, the tunnel broker server 60 returns a list of its capabilities (step 108) to the tunnel client 50 over the control channel 40. The capabilities of the tunnel broker server 60 include, for example, authentication mechanisms, types of tunnel supported, lengths of IPv6 prefixes that can be assigned, as well as Domain Name Service (DNS) delegation supported, and router peering protocols supported, etc.

In step 110, the tunnel client 50 determines whether the capabilities of the tunnel broker server 60 are satisfactory for the purposes it requires. If not, the tunnel client 50 closes the tunnel setup protocol session (step 112) and the process ends. Otherwise, the tunnel client 50 selects an authentication mechanism from the list supported by the tunnel broker server 60 and specifies the authentication mechanism in an authentication message sent via the control channel 40 to the tunnel broker server 60 (step 114). Subsequently, the tunnel broker server 60 and the tunnel client 50 exchange authentication data (step 116) via the control channel 40. In step 118, the tunnel broker server 60 verifies the tunnel client authentication data.

Figure 3A:
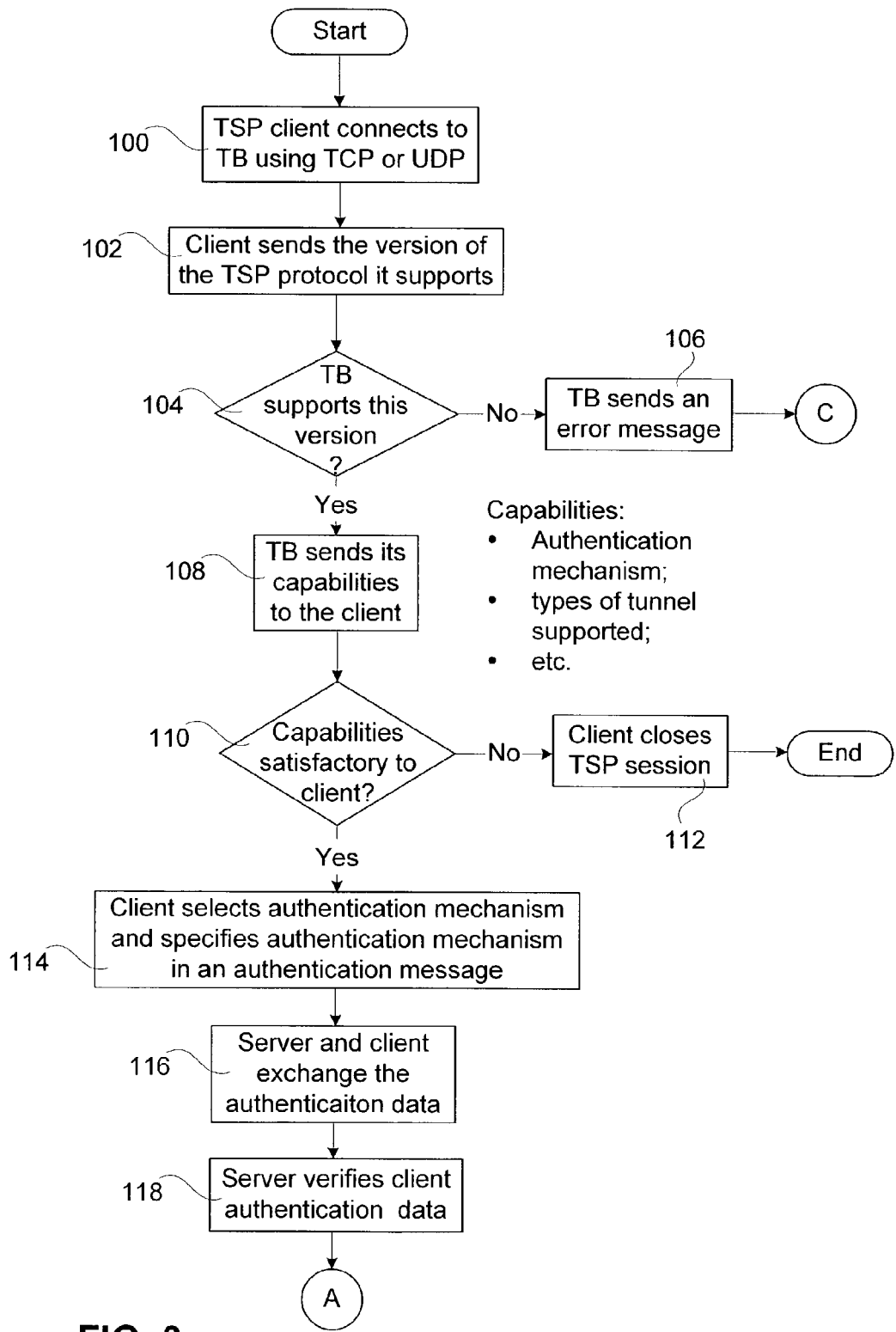
FIGS. 3a-3d are a flow chart of a method for connecting IPv6 devices through an IPv4 network using a tunnel setup protocol.
Figure 3B:
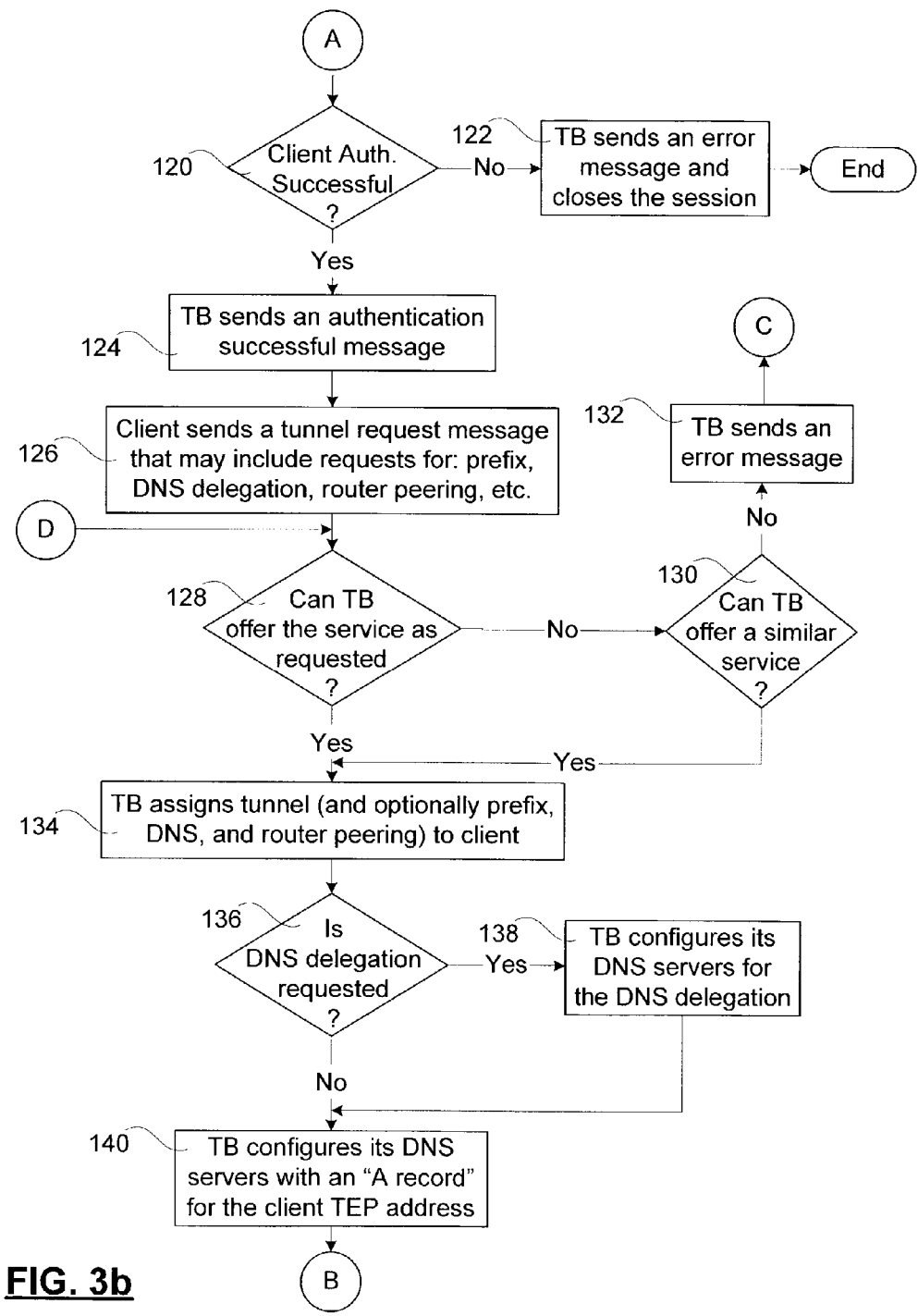
Figure 3C:
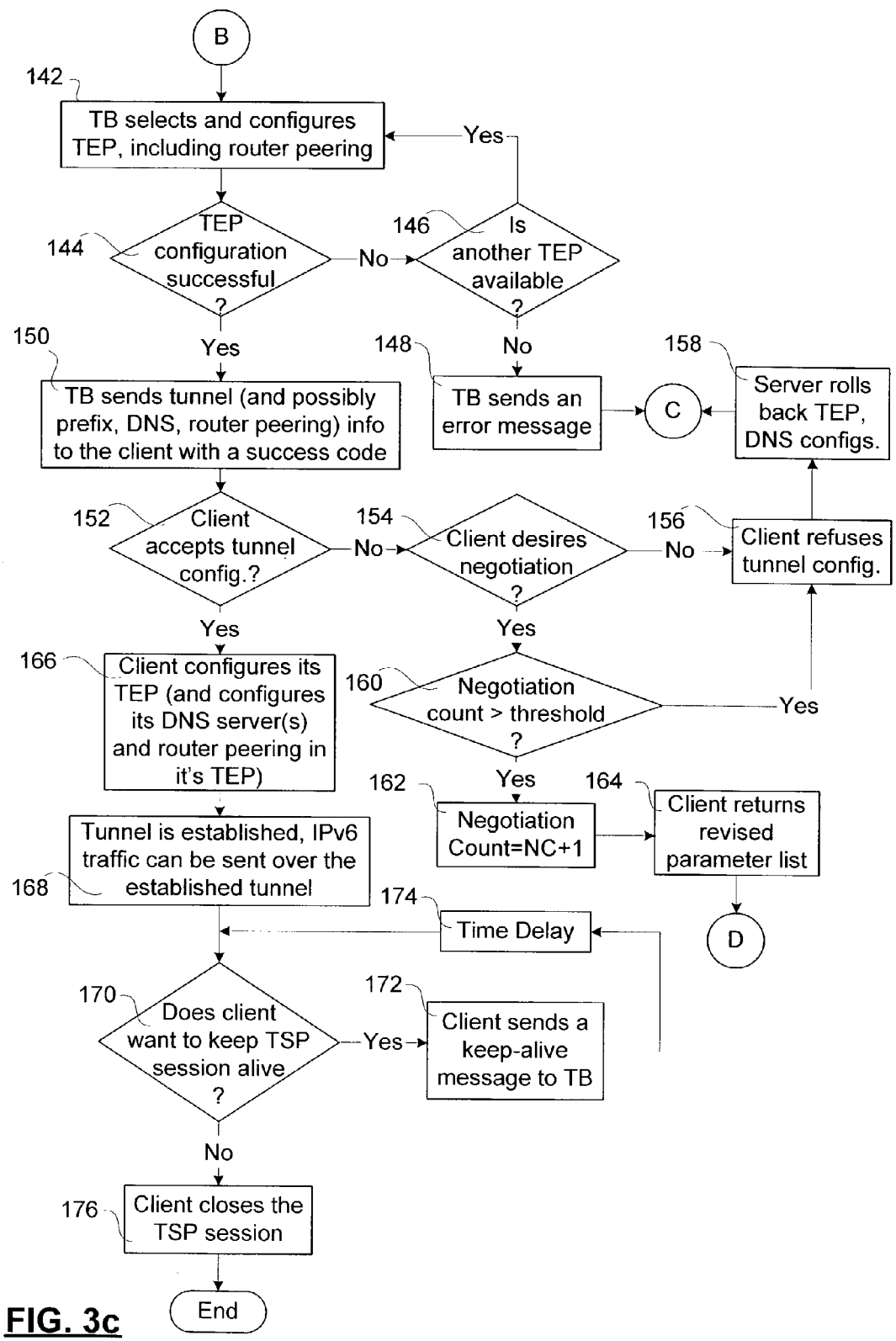
Figure 3D:
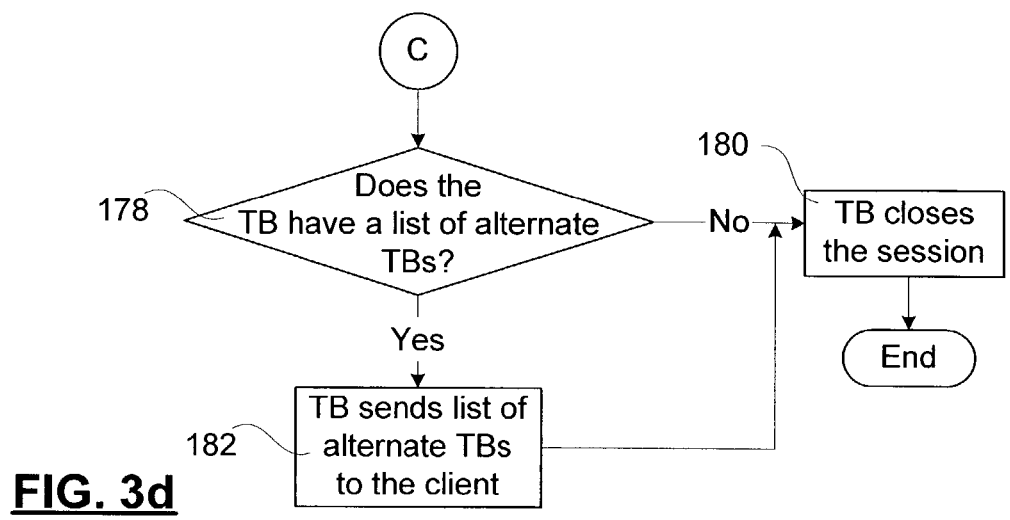

As shown in FIG. 3b, after verifying the tunnel client authentication data, the tunnel broker server 60 determines whether the tunnel client 50 is authorized to establish the tunnel (step 120). If the tunnel client 50 is not authorized to establish the tunnel, the tunnel broker server 60 returns an error message via the control channel 40 and closes the session (step 122). If the tunnel client 50 is authorized to establish the tunnel, the tunnel broker server 60 returns an authentication successful message (step 124) to the tunnel client 50. The tunnel client 50 then sends a tunnel request message via the control channel 40 (step 126) to the tunnel broker server 60. The tunnel request message may include requests for an IPv6 prefix, a DNS delegation, router peering, etc., as will be explained below in more detail. On receipt of the tunnel request message, the tunnel broker server 60 determines whether it is provisioned to offer the service as requested (step 128). If not, the tunnel broker server 60 determines (step 130) whether it is provisioned to offer a similar service. If not, the tunnel broker server 60 returns an error message via the control channel 40 and branches to step C, where it determines in step 178 (see FIG. 3d) if it is provisioned with a list of alternate tunnel broker servers. If not, it closes the session (step 180). If so, it returns the list via the control channel 40 to the tunnel client 50 to permit the tunnel client 50 to attempt the establishment of an IPv6-in-IPv4 tunnel using another tunnel broker.

If the tunnel broker is provisioned to provide the requested service or a similar service as determined in steps 128, 130, the tunnel broker server 60 assigns an IPv6-in-IPv4 tunnel to the tunnel client. The tunnel broker may also assign an IPv6 prefix in a manner well known in the art, provide domain name service (DNS) delegation, as will be explained below in more detail, and router peering to the tunnel client 50, as appropriate (step 134).

In step 136, the tunnel broker server 60 determines whether DNS delegation has been requested. If so, the tunnel broker server 60 configures its DNS servers for the DNS delegation by writing the tunnel client's DNS server addresses to DNS servers associated with the tunnel broker server 60, to point to the tunnel client's DNS servers for name space associated with the assigned IPv6 prefix (step 138). If DNS delegation is not requested, the tunnel broker server 60 configures its DNS servers with an "A record" (step 140) for the client tunnel endpoint address, in a manner known in the art. In step 142 (FIG. 3c), the tunnel broker server 60 selects and configures a tunnel endpoint for the tunnel it assigned in step 134. The configuration of the tunnel endpoint includes configuring router peering. The tunnel broker then awaits confirmation that the tunnel endpoint configuration was successful (step 144). If the configuration was not successful, the tunnel broker server 60 determines in step 146 whether another tunnel endpoint is available by, for example, consulting a table of tunnel endpoints stored in the tunnel broker server memory (step 146). If another tunnel endpoint is not available, or all tunnel endpoints are at capacity, the tunnel broker server 60 sends an error message over the control channel (step 148) to the tunnel client 50 and branches to steps 178-180, as explained above.

If the tunnel endpoint configuration is determined to be successful in step 144, the tunnel broker server 60 sends the tunnel configuration parameters along with any required IPv6 prefix, DNS information, router peering information, etc. to the tunnel client 50 using the control channel 40, along with a success code (step 150). On receipt of this information, the tunnel client determines whether it will accept the tunnel configuration (step 152). If it does not find the tunnel configuration acceptable, the tunnel client determines (step 154) whether it will negotiate a different configuration. It should be noted that the tunnel client may be implemented with or without the capacity for parameter negotiation. If it is not equipped for negotiation or decides to terminate negotiation, the process moves to step 156, in which the client refuses the tunnel configuration and advises the tunnel broker 60 by sending a refusal message over the control channel 40 (step 156). On receipt of the refusal message, the tunnel broker server 60 rolls back the configuration of the tunnel endpoint, the DNS configurations, etc. (step 158) and branches to steps 178-180, as explained above.

If the client determines in step 154 that it will negotiate the tunnel configuration, it may, for example, assess whether negotiation should proceed by comparing a negotiation count with a predetermined threshold (step 160). If the negotiation count is greater than the threshold, the process branches to steps 156, 158 and 178-180, as explained above. Otherwise, the negotiation counter is incremented (step 162) and the tunnel client 50 returns via the control channel 40 a revised parameter list to the tunnel broker server 60 and the process branches back to step 128.

If the tunnel client accepts the tunnel configuration in step 152, the tunnel client 50 configures its tunnel endpoint and, if required, configures its DNS server(s) as explained above, and router peering in its tunnel endpoint, if required (step 166). The tunnel is thus established and IPv6 traffic can be sent over the established tunnel (step 168). The tunnel client 50 then determines whether it wants to keep the tunnel setup protocol session alive (step 170). If so, the tunnel client 50 sends a keep-alive message to the tunnel broker server 60 via the control channel 40 (step 172) and after a predetermined time delay (step 174) repeats steps 170, 172. If the tunnel client 50 does not wish to keep the tunnel setup protocol session alive, the tunnel client 50 closes the tunnel setup protocol session by dropping the control channel 40 (step 176). The tunnel established between the tunnel endpoints continues, however, for a period determined by the tunnel broker server 60, or through negotiation with the tunnel client 50, for a predetermined period of time, as will be explained below with reference to FIGS. 4 and 5.

Figure 4:
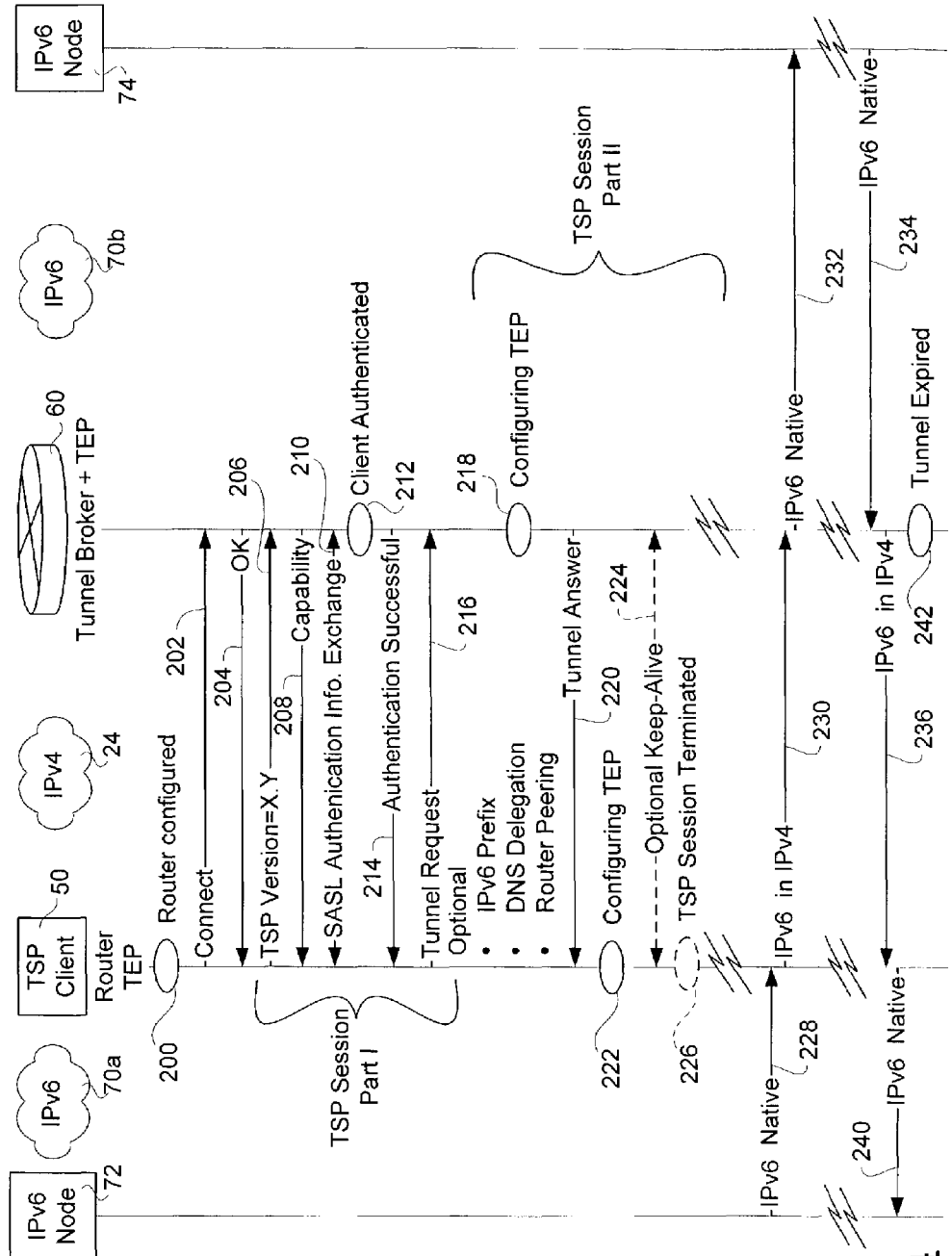
FIG. 4 is a connection progress diagram of the establishment of an IPv6-in-IPv4 tunnel between a tunnel client and a tunnel broker server, and subsequent use of the tunnel by IPv6 nodes connected to respective IPv6 networks.

FIG. 4 is a connection progression diagram illustrating an exemplary implementation of the, tunnel setup protocol in accordance with the invention. In this example, an IPv6-in-IPv4 tunnel is established between a tunnel client 50 and a tunnel broker server 60, which respectively serve as endpoints for the tunnel. The tunnel client 50 is a router that is connected to an IPv6 network 70*a* and the IPv4 network 24. Consequently, the tunnel client 50 is provisioned with an IPv4 stack as well as an IPv6 stack and is further provisioned to encapsulate IPv6 packets in IPv4 packets, as well as to decapsulate IPv6 packets encapsulated in IPv4 packets, to permit IPv6 traffic to pass through the tunnel. The tunnel broker server 60 is likewise connected to both the IPv4 network 24 and the IPv6 network 70 and provisioned with the same stacks and data encapsulation/decapsulation capability.

As shown in the diagram, in step 200, the router is configured as a tunnel client 50. Once configured as a tunnel client 50 so that it knows how to contact the tunnel broker server 60, the router is provisioned to establish a control channel 40 to the tunnel broker server 60, as explained above. Subsequently, in step 202, the tunnel client 50 sends a connect message to the tunnel broker server 60 to establish the control channel 40. The tunnel client 50 may be prompted to establish the control channel for any number of reasons. For example, the tunnel client 50 is prompted to establish the control channel when the IPv6 node 72 generates IPv6 traffic addressed to an IPv6 node in a different IPv6 network, on reboot, on re-establishing IPv4 re-connectivity, etc. On receipt of the connect message, the tunnel broker server 60 returns an acknowledgement message (step 204) and the control channel 40 is established. The tunnel client 50 then sends the version of the tunnel setup protocol it supports to the tunnel broker server 60 (step 206) via the control channel 40. The tunnel broker server 60 returns, via the control channel 40, a list of the tunnel setup functions it supports (step 208). The tunnel client 50 selects an authentication mechanism and authentication information is exchanged (step 210). In step 212, the tunnel broker server 60 determines that the tunnel client 50 is authorized for the service and returns an authorization successful message (step 214). On receipt of the message, the tunnel client 50 formulates a tunnel request message which it sends to the tunnel broker server 60 in step 216. The request, as explained above, optionally includes a request for an IPv6 prefix, DNS delegation, and a router peering. On receipt of the request, the tunnel broker 60, in this example, is provisioned to satisfy the request and configures a tunnel endpoint (step 218) to serve the request.

The tunnel broker server 60 then returns a tunnel answer message (step 220) which includes tunnel configuration parameters, including IPv4 and IPv6 addresses for both the tunnel broker server and the tunnel client endpoints as well as any other information requested by the tunnel client 50 in step 216. On receipt of the tunnel answer message, the tunnel client configures its tunnel endpoint (step 222). Thereafter, the tunnel client 50 may optionally send keep-alive messages (step 224), as explained above, to keep control channel 40 open. The tunnel client may also optionally terminate the tunnel protocol session (step 226) at any time. After step 220 is complete, the tunnel is established and data packets can flow between the IPv6 node 72 and the IPv6 node 74, as shown in steps 228-240.

Included in the information sent by the tunnel broker server 60 in the tunnel answer (step 220), was a tunnel lifetime parameter, which specifies a duration of the IPv6-in-IPv4 tunnel. When the tunnel lifetime expires (step 242), the tunnel broker server 60 deconstructs the tunnel endpoint, DNS delegation and router peering so that traffic can no longer pass through the tunnel, as explained below with reference to FIG. 5.

Figure 5:
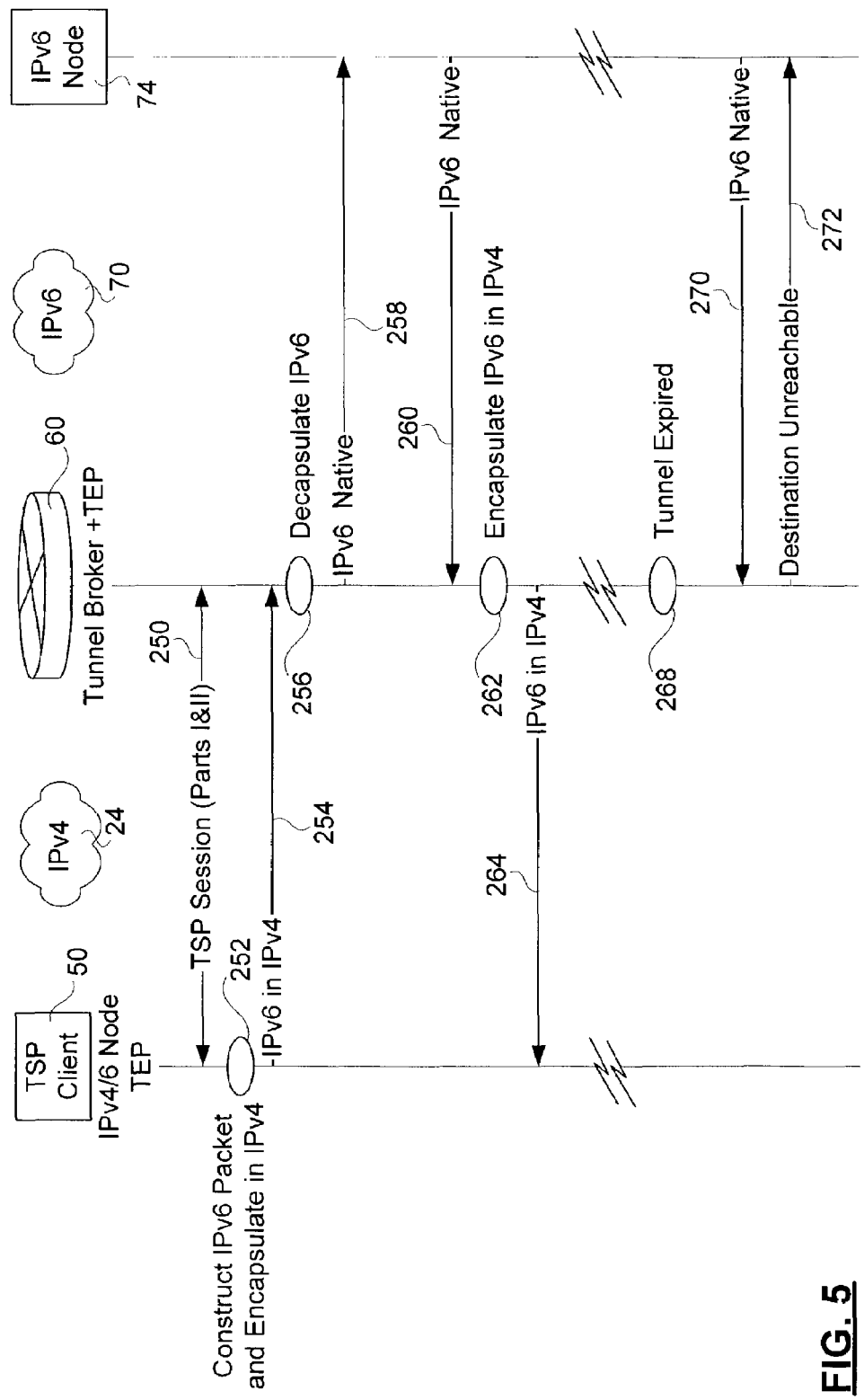
FIG. 5 is a connection progress diagram of another implementation of the invention in which a tunnel client connects to a tunnel broker server and establishes an IPv6-in-IPv4 tunnel for the purposes of communicating with an IPv6 node in an IPv6 network.

FIG. 5 is a connection progression diagram that further explains the process in accordance with the invention. In this example, the tunnel setup protocol client 50 is an IPv4/6 node that serves as a tunnel endpoint. In step 250, the tunnel protocol session parts I and II are performed as described above with reference to FIG. 4. In step 252, the tunnel client 50 starts an IP session by constructing an IPv6 packet and encapsulating the IPv6 packet in an IPv4 packet in a manner known in the art. The IPv6 packet is sent in step 254 through the tunnel to the tunnel broker server 60. The tunnel broker server 60 decapsulates the IPv6 packet (step 256) and forwards it in IPv6 native format to the IPv6 node 74 (step 258). The IPv6 node 74 returns an IPv6 packet in IPv6 native format (step 260). The packet is encapsulated in an IPv4 packet by the tunnel broker server 60 (step 262) and forwarded through the tunnel in step 264. In step 268, the tunnel lifetime expires and the tunnel endpoint is deconstructed, as explained above. Thereafter, when the IPv6 node 74 sends an IPv6 packet in native format (step 270), the tunnel broker returns a destination unreachable packet (step 272) in a manner known in the art.

Figure 6:
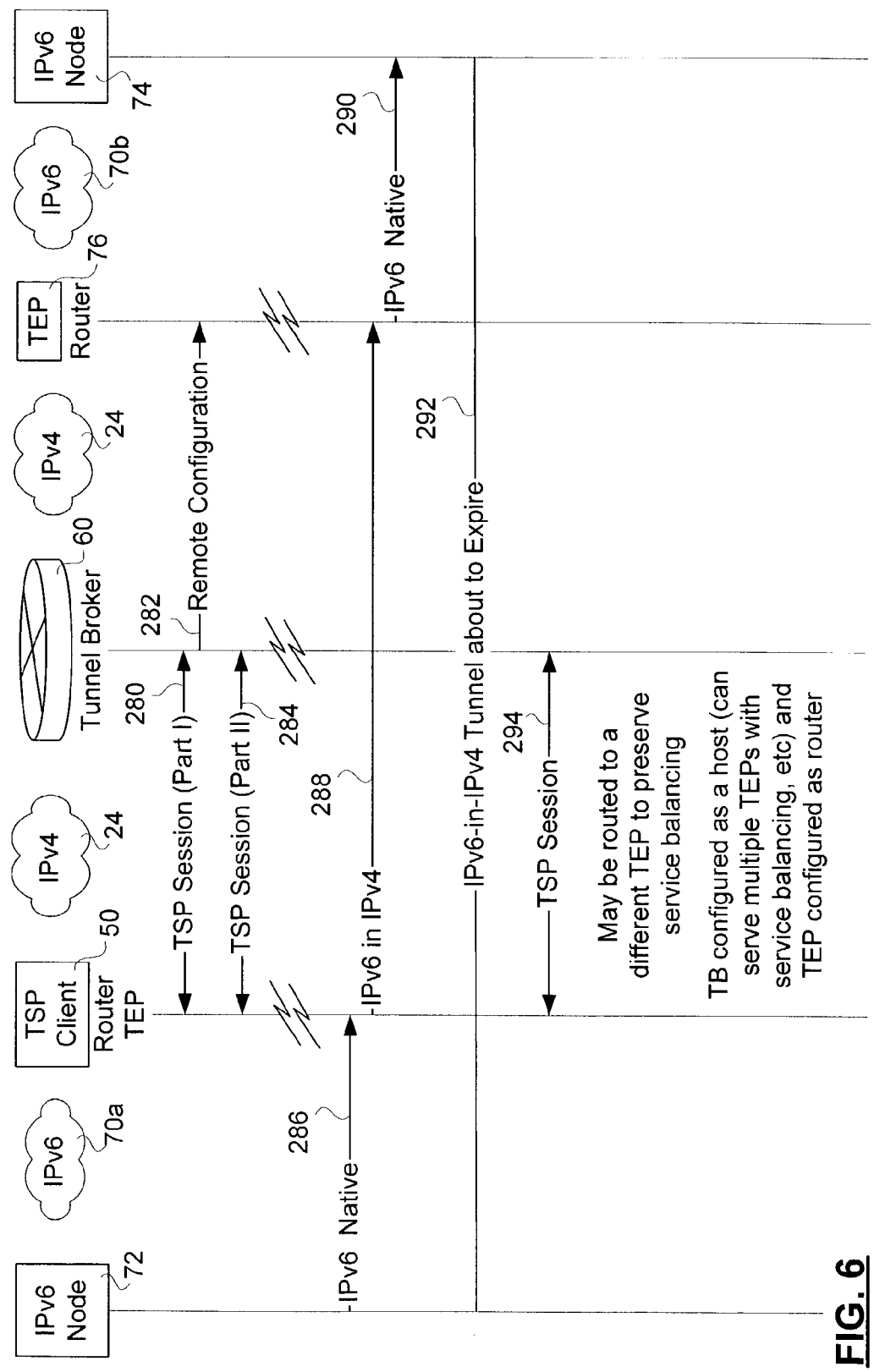
FIG. 6 is a connection progress diagram illustrating the establishment of an IPv6-in-IPv4 network in which the tunnel broker server configures a remote router as the tunnel endpoint for the IPv6-in-IPv4 tunnel.

FIG. 6 is a connection progression diagram that illustrates the re-establishment of a tunnel using a tunnel setup protocol session prior to the expiry of a tunnel being used by the tunnel client. In this example, the tunnel broker server 60 configures a remote tunnel endpoint which is a router 76 connected between the IPv4 network 24 and the IPv6 network 70b. In step 280, the tunnel setup protocol session (part I) is conducted between the tunnel client 50 and the tunnel broker server 60, as explained above with reference to FIG. 4. After the tunnel broker server 60 receives the tunnel request message from the tunnel client 50, the tunnel broker server 60 configures a remote router 76 as the tunnel endpoint (step 282) and, the tunnel session concludes with the part II procedures described above (step 284). Thereafter, IPv6 node 72 connected to IPv6 network 70a sends IPv6 packets through the tunnel (steps 286-290) to IPv6 node 74. Meanwhile, the tunnel client 50 monitors the lifetime of the tunnel established with the tunnel broker server 60 and, when the IPv6-in-IPv4 tunnel is about to expire, as shown at step 292, the tunnel client 50 re-initiates tunnel setup protocol sessions parts I and II to re-establish the tunnel through the IPv4 network (step 294). It should be noted that the tunnel broker server 60 may route to a different tunnel endpoint to preserve service balancing. A tunnel broker server 60 configured as a host can serve multiple tunnel endpoints to enable and facilitate service balancing, etc. In that case, the tunnel endpoints are normally configured as routers 76 connected to both the IPv4 network 24 and the IPv6 network 70. As also explained above, such routers are provisioned with both IPv4 and IPv6 stacks as well as encapsulation/decapsulation capability.

Figure 7:
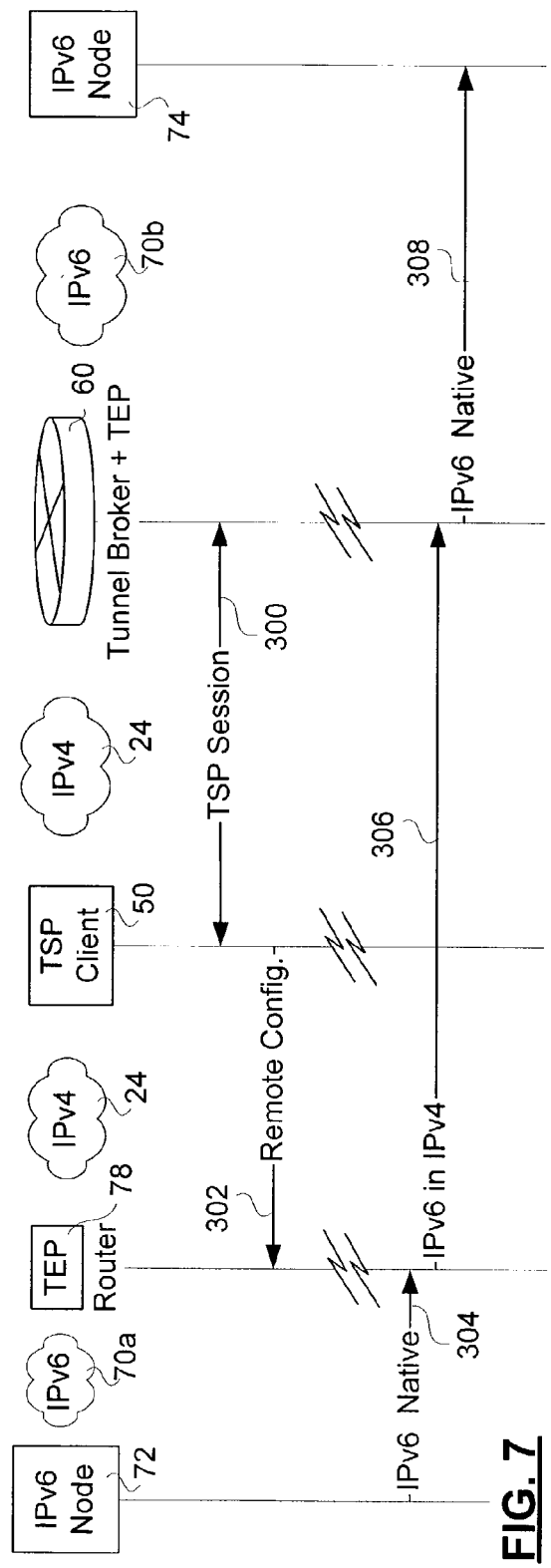
FIG. 7 is a connection progress diagram illustrating a method in accordance with the invention in which a tunnel client configures a remote router as the tunnel endpoint for an IPv6-in-IPv4 tunnel used to permit communication between IPv6 nodes in respective IPv6 networks.

FIG. 7 illustrates yet another potential configuration of a system in accordance with the invention in which the tunnel client 50 is configured as a host adapted to configure one or more remote tunnel endpoints in the same way that the tunnel broker server 60 configures remote tunnel endpoints as explained above. In step 300, the tunnel setup protocol sessions parts I and II are performed to the point that the tunnel client configures the tunnel endpoint (step 300). In step 302, the tunnel client 50 configures the remote tunnel endpoint at a router 78 selected, for example, from a table of available tunnel endpoint routers that serve as gateways to the IPv6 network 70a. In order to configure the tunnel endpoint, the tunnel client 50 sends the IPv4 and IPv6 addresses of the tunnel endpoint 78 and the tunnel endpoint configured at the tunnel broker server 60. Thereafter, the IPv6 node 72 is enabled to communicate with IPv6 node 74 using IPv6 native packets which are encapsulated, as explained above, and moved through the IPv4 network 24 (steps 304-308) using the tunnel established in steps 300, 302.

Figure 8:
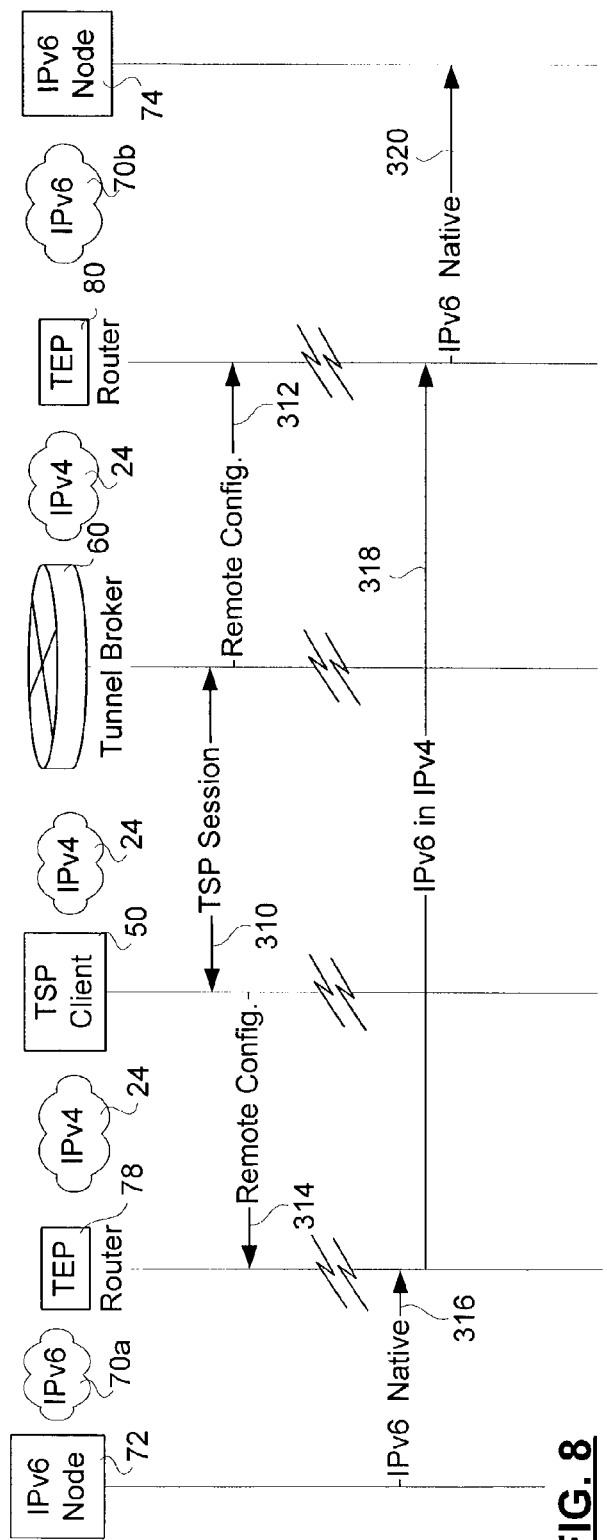
FIG. 8 is a connection progress diagram showing an implementation of the invention in which both the tunnel client and the tunnel broker server configure remote routers to serve as tunnel endpoints for an IPv6-in-IPv4 tunnel.

FIG. 8 is a connection progression diagram illustrating yet another implementation of the system in accordance with the invention in which both the tunnel client 50 and the tunnel broker server 60 configure remote tunnel endpoints. In this embodiment, the tunnel client 50 initiates and conducts a tunnel setup protocol session (step 310). As part of the tunnel setup protocol session, a tunnel broker server 60 configures a remote gateway router 80 to serve as a tunnel endpoint (step 312), as described above. The tunnel client 50 likewise configures a remote gateway router 78 to serve as a tunnel endpoint (step 314). Thereafter, the IPv6 node 72 is enabled to send IPv6 packets in native format to the IPv6 node 74 (steps 316-320), and vice versa.

Figure 9:
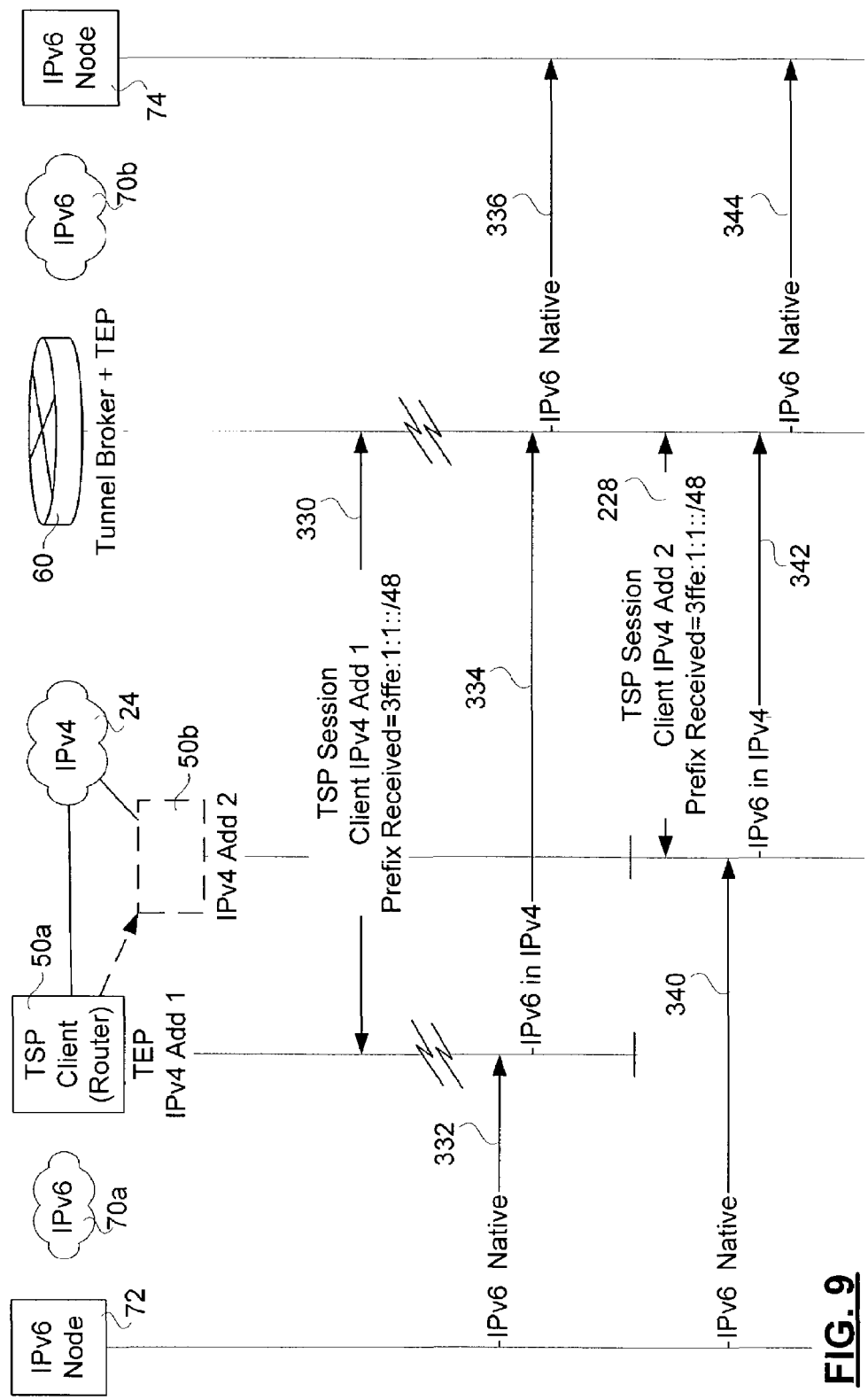
FIG. 9 is a connection progress diagram illustrating the establishment of IPv6-in-IPv4 tunnels by a mobile tunnel client.

FIG. 9 is a connection progression diagram that illustrates yet another implementation of the system in accordance with the invention. In this example, the tunnel client 50 is a mobile device, such as a cellular telephone, a personal data assistant (PDA) or a laptop computer, which serves as a router in an IPv6 subnetwork. As illustrated, the mobile device in a first location functions as a tunnel client 50a having an IPv4 address 1. In the first location, the mobile tunnel client 50a commences and performs a tunnel setup protocol session with the tunnel broker (step 330) and in the course of the tunnel setup protocol session receives an IPv6 prefix from the tunnel broker server 60. In this example, the prefix received is "3ffe:1:1::/48. As is well known in the art, this prefix is known as a "/48" prefix which permits the tunnel client router to assign session addresses to IPv6 devices in the domain it controls, in a manner well known in the art. After the tunnel is established in step 330, the IPv6 node 72 is enabled to communicate with the IPv6 node 74 (steps 332-336) by sending and receiving IPv6 packets in native format. Subsequently, the mobile tunnel client 50 moves to location 50b and its service provider in the IPv4 network assigns a new IPv4 address (ADDR 2). Consequently, a new tunnel must be established. The tunnel client 50b therefore initiates and performs the tunnel setup protocol session (step 338) with the tunnel broker server 60 and receives the same IPv6 prefix "3ffe:1:1::/48". Consequently, a new tunnel is established between the mobile tunnel client 50b and the tunnel broker server 60 that permits the IPv6 node 72 to again send IPv6 packets in native format to the IPv6 node 74 (steps 340-344). By receiving the same IPv6 prefix, the IPv6 node keeps its same IPv6 address. Consequently, in the IPv6 realm the mobility of the IPv6 tunnel end point is not perceived.

The methods and apparatus in accordance with the invention therefore permit mobile devices to automatically establish IPv6-in-IPv4 tunnels through the IPv4 network to permit IPv6 nodes to communicate with other IPv6 nodes in other IPv6 subnetworks. This is of critical importance to the exponentially expanding use of wireless devices and mobile devices in general, and permits seamless networking of such devices.

The embodiment(s) of the invention described above is(are) intended to be exemplary only. The scope of the invention is therefore intended to be limited solely by the scope of the appended claims.

We claim:

1. A method for connecting IPv6 devices through an IPv4 network to an IPv6 node in an IPv6 network using a tunnel setup protocol, comprising steps of:
   using Transfer Control Protocol (TCP) messaging to establish a control channel between a tunnel client in the IPv4 network and a tunnel broker server in the IPv4 network; and at the tunnel client:
  sending to the tunnel broker server, via the control channel, a request to establish an IPv6-in-IPv4 tunnel through the IPv4 network, the request including tunnel configuration parameters desired by the tunnel client; and
  receiving from the tunnel broker server, via the control channel, any one of: a first acceptance of the request with a specification of information respecting the tunnel configuration parameters; a second acceptance of the request with a specification of at least one alternate parameter for the tunnel configuration; and, a refusal of the request;
wherein:
  if either acceptance of the request is received from the tunnel broker server, the tunnel client periodically sends a keep-alive message to the tunnel broker server to maintain the tunnel setup protocol session with the tunnel broker server; and
  if a refusal of the request is received from the tunnel broker server, the tunnel client further receives from the tunnel broker server, via the control channel, a list of alternate tunnel broker servers which may be used by the tunnel client.

2. The method as claimed in claim 1 wherein after the control channel is established with the tunnel broker server, the method further comprises steps of:
  sending from the tunnel client to the tunnel broker server a version of a tunnel session protocol installed on the tunnel client;
  determining at the tunnel broker server whether the version of the tunnel session protocol is supported by the tunnel broker server; and
  returning an error message from the tunnel broker server to the tunnel client if the version of the tunnel session protocol is not supported by the tunnel broker server.

3. A method as claimed in claim 2 further comprising, after returning an error message, returning, from the tunnel broker server to the tunnel client, a list of alternate tunnel broker servers to permit the tunnel client to attempt to obtain service from another tunnel broker server.

4. A method as claimed in claim 2 wherein if the tunnel broker server supports the version of the tunnel session protocol, the method further comprises a step of returning, from the tunnel broker server to the tunnel client, service capabilities of the tunnel broker server.

5. A method as claimed in claim 4 wherein the service capabilities comprise a specification of authentication types, and the method further comprises steps of selecting by the tunnel client an authentication type, and sending authentication information to the tunnel broker server to permit the tunnel broker server to verify that the client is authenticated for the service.

6. A method as claimed in claim 1 wherein the step of sending the request comprises formulating either one of a Transfer Control Protocol (TCP) and an User Data Part (UDP) message.

7. A method as claimed in claim 1 wherein the step of sending the request comprises formulating the desired tunnel configuration parameters, wherein the desired tunnel configuration parameters comprise a tunnel action type, a tunnel type, and an IPv4 tunnel endpoint address.

8. A method as claimed in claim 7 wherein the desired tunnel configuration parameters further comprise a request for an IPv6 prefix of a specified length, a domain name service (DNS) delegation and router peering.

9. A method as claimed in claim 1 wherein receiving either acceptance comprises receiving information specifying a tunnel lifetime, a tunnel client endpoint IPv4 address, a tunnel client endpoint IPv6 address, a tunnel broker server endpoint IPv4 address, and a tunnel broker server endpoint IPv6 address.

10. A method as claimed in claim 9 further comprising configuring a tunnel client endpoint, by the tunnel client, using the received tunnel client endpoint IPv4 address and the tunnel client endpoint IPv6 address.

11. A method as claimed in claim 10 wherein the step of configuring the tunnel client endpoint comprises a step of configuring the tunnel client as the tunnel client endpoint.

12. A method as claimed in claim 10 wherein the step of configuring the tunnel client endpoint comprises a step of configuring a router or a host that is not the tunnel client as the tunnel client endpoint.

13. A method as claimed in claim 1 wherein prior to the step of receiving either acceptance of the request by the tunnel client, the tunnel broker server configures a tunnel broker server endpoint, wherein the tunnel broker server endpoint is selected from a list of tunnel endpoints available to the tunnel broker server.

14. A method as claimed in claim 13 wherein if the step of configuring the tunnel broker server endpoint is unsuccessful, the tunnel broker server returns an error message to the tunnel client, along with the refusal of the request.

15. A method as claimed in claim 13 wherein the tunnel broker server has an IPv4 stack and an IPv6 stack and the tunnel broker server configures itself as the tunnel broker server endpoint using the tunnel broker server IPv4 endpoint address and the tunnel broker server IPv6 endpoint address.

16. A method as claimed in claim 13 wherein the tunnel broker server selects a node from a list of nodes having an IPv4 and an IPv6 stack and designated to serve as a tunnel broker server endpoint, and configures the selected node to serve as the tunnel broker server endpoint using the IPv4 tunnel broker server endpoint address and the IPv6 tunnel broker server endpoint address.

17. A method as claimed in claim 1 wherein after the tunnel client receives a first acceptance of the request, the tunnel client closes the control channel.

18. An apparatus for connecting IPv6 devices through an IPv4 network to an IPv6 node in an IPv6 network using a tunnel setup protocol, comprising:
  a tunnel broker server in the IPv4 network programmed to:
    respond to Transfer Control Protocol (TCP) messaging to establish a control channel with a tunnel client in the IPv4 network;
    authenticate the tunnel client;
    receive a request from the tunnel client, via the control channel, to establish an IPv6-in-IPv4 tunnel through the IPv4 network;
    accept desired parameters for a configuration of the IPv6-in-IPv4 tunnel from the tunnel client;
    determine whether the desired parameters for the configuration of the IPv6-in-IPv4 tunnel can be satisfied;
    if the desired parameters can be satisfied, configure a tunnel broker server endpoint using the desired parameters; and
    if the desired parameters cannot be satisfied, return a list of other tunnel broker servers which may be used by the tunnel client;
  the tunnel client being programmed to:
    establish a control channel with the tunnel broker server;

provide authentication information to the tunnel broker server to permit the tunnel broker server to authenticate the tunnel client;

sending to the tunnel broker server a request to establish an IPv6-in-IPv4 tunnel through the IPv4 network, the request including desired parameters for a configuration of an IPv6-in-IPv4 tunnel;

receive from the tunnel broker server, via the control channel, any one of: a first acceptance of the request with a specification of information respecting the desired tunnel configuration parameters; a second acceptance of the request with a specification of at least one alternate parameter for the tunnel configuration; and, a refusal of the request;

if either acceptance of the request is received from the tunnel broker server, configure a tunnel client endpoint; and maintain the control channel with the tunnel broker server by periodically sending keep-alive messages to the tunnel broker server after the tunnel client has configured the tunnel client endpoint.

19. An apparatus as claimed in claim 18 wherein the tunnel broker server is further programmed to return one of the two acceptances to the tunnel client after accepting the desired parameters for a configuration of the IPv6-in-IPv4 tunnel from the tunnel client.

20. An apparatus as claimed in claim 18 wherein the tunnel broker server is further programmed to select the tunnel broker server endpoint from a list of tunnel endpoints available to the tunnel broker server.

21. An apparatus as claimed in claim 19 wherein the tunnel broker server is programmed to configure a tunnel broker server endpoint before returning either acceptance to the tunnel client.

22. An apparatus as claimed in claim 21 wherein the tunnel broker server is programed to roll back a configuration of the tunnel broker server endpoint if a second acceptance is sent to the tunnel client, and the specification of at least one alternate parameter for the tunnel configuration is rejected by the tunnel client.

23. An apparatus as claimed in claim 18 wherein the tunnel client is a router and is further programmed to include a request for an IPv6 prefix of a specified length in the desired parameters for configuration of the IPv6-in-IPv4 tunnel.

24. An apparatus as claimed in claim 18 wherein the tunnel client is programmed to configure itself as a tunnel client endpoint.

25. An apparatus as claimed in claim 18 wherein the tunnel client is programmed to configure another node the IPv4 network as the tunnel client endpoint.

26. A system for connecting IPv6 devices through an IPv4 network to an IPv6 node in an IPv6 network using a tunnel setup protocol, comprising:

a tunnel broker server and a tunnel client that function as respective nodes in the IPv4 network, the tunnel broker server being programmed to respond to a message sent from the tunnel client to establish a control channel between the tunnel client and the tunnel broker server; use the control channel to authenticate the tunnel client; receive a request from the tunnel client, via the control channel, to establish an IPv6-in-IPv4 tunnel through the IPv4 network, and accept desired parameters for a configuration of the IPv6-in-IPv4 tunnel sent by the tunnel client via the control channel;

the tunnel broker server and the tunnel client being programmed to configure a respective tunnel broker server endpoint and a tunnel client endpoint for the IPv6-in-IPv4 tunnel;

the tunnel client being programmed to maintain the control channel with the tunnel broker server by periodically sending keep-alive messages to the tunnel broker server after the tunnel client has configured the tunnel client endpoint; and the tunnel broker server being programmed to return a list of other tunnel broker servers which may be used by the tunnel client, if the tunnel broker server cannot provide service in accordance with the desired parameters for configuration of the IPv6-in-IPv4 tunnel sent by the tunnel client.

27. The system as claimed in claim 26 wherein the tunnel client is a host in the IPv4 network.

28. The system as claimed in claim 26 wherein the tunnel client is a router having an IPv4 stack and an IPv6 stack, and at least one link to each of the IPv4 and IPv6 networks.

29. The system as claimed in claim 26 wherein the tunnel broker server is programmed to assign an IPv6 prefix to be used by the tunnel client endpoint for a duration of the IPv6-in-IPv4 tunnel.

30. The system as claimed in claim 29 wherein the tunnel client is programmed to request the IPv6 prefix from the tunnel broker server.

* * * * *